(12) United States Patent
Myaeng et al.

(10) Patent No.: US 8,335,527 B2
(45) Date of Patent: Dec. 18, 2012

(54) METHOD FOR PROVIDING HYPERTEXT LINKS IN MOBILE TERMINAL

(75) Inventors: Sung Hyon Myaeng, Daejeon (KR); Hye Ju Jang, Seoul (KR); Wook Hyun Shin, Andong-si (KR); Seong Chan Kim, Jeonju-si (KR); Chil Woo Lee, Gwangju (KR)

(73) Assignees: KAIST, Technology Commercialization Team, Daejeon (KR); University Industry Liaison Office of CNU, Gwangju (KR)

( * ) Notice: Subject to any disclaimer, the term of this patent is extended or adjusted under 35 U.S.C. 154(b) by 0 days.

(21) Appl. No.: 12/831,743

(22) Filed: Jul. 7, 2010

(65) Prior Publication Data

US 2011/0130123 A1  Jun. 2, 2011

(30) Foreign Application Priority Data

Nov. 30, 2009  (KR) ........................ 10-2009-0116877

(51) Int. Cl.
*H04W 4/12* (2009.01)
(52) U.S. Cl. .................. 455/466; 455/412.1; 455/414.1
(58) Field of Classification Search ............... 455/412.1, 455/412.2, 412.3, 414.1, 466, 566; 715/758, 715/759, 760, 761
See application file for complete search history.

(56) References Cited

U.S. PATENT DOCUMENTS

| 7,415,349 | B2 * | 8/2008 | Sato et al. ...................... 701/112 |
| 8,150,428 | B2 * | 4/2012 | Kupsh et al. .................. 455/466 |
| 2005/0187965 | A1 * | 8/2005 | Abajian ........................ 707/102 |
| 2007/0049258 | A1 * | 3/2007 | Thibeault ................... 455/414.1 |
| 2007/0233806 | A1 * | 10/2007 | Asadi ............................ 709/217 |
| 2008/0300982 | A1 * | 12/2008 | Larson et al. ................... 705/14 |
| 2009/0100048 | A1 * | 4/2009 | Hull et al. ......................... 707/5 |
| 2009/0157708 | A1 * | 6/2009 | Bandini et al. ................. 707/100 |
| 2009/0228779 | A1 * | 9/2009 | Williamson et al. .......... 715/233 |
| 2010/0050089 | A1 * | 2/2010 | Kim et al. ..................... 715/749 |
| 2010/0191648 | A1 * | 7/2010 | Smith ............................. 705/42 |
| 2011/0053568 | A1 * | 3/2011 | Christianson et al. ..... 455/414.1 |
| 2011/0119600 | A1 * | 5/2011 | Liu et al. ....................... 715/760 |
| 2011/0164610 | A1 * | 7/2011 | Cabasse et al. ............... 370/352 |

* cited by examiner

*Primary Examiner* — Cong Tran
(74) *Attorney, Agent, or Firm* — The Webb Law Firm (57) ABSTRACT

There are provided a method for managing and searching information in a mobile terminal and methodology for constructing the method. The method comprises: when a text is provided, preprocessing the provided text; extracting anchor text candidates in the preprocessed text; calculating relatedness between terms; determining ranking based on the relatedness using context information; and constructing a hypertext system for providing hypertext links to the provided text based on the ranking. Accordingly, there is provided a method for providing hypertext links in a mobile terminal, which provides information management and search function using the hypertext links, so that information in the mobile terminal can be constructed by the hypertext links, thereby promoting user's convenience.

12 Claims, 9 Drawing Sheets

SMS List

1. Today is Momo's birthday~ a lot of fun!
Seongchan 1249873397000

2. Do we have a nlp class tomorrow?
Wookhyun 1250044388000

3. We're gonna have a trip to East sea tomorrow. Do you have class tomorrow?
Wookhyun 1249873397000

I've just finished the

FIG. 4b

SMS Message

Do we have a nlp class  tomorrow?

Wookhyun
2009-08-12 11:33:08

FIG. 4c

SMS Message

Do we have a nlp class  tomorrow?

Wookhyun
2009-08-12 11:33:08

[EMAIL] Dear Student
The NLP class nex...
    [NOTE] Project Meeting for IT Managem...
    [NOTE] Natural Language Processing Le...

FIG. 4d

E-mail Message

To Students
NLP TA
2009-08-07 12:15:03

Dear student
The NLP class  next week will be canceled due to the professor's business trip suddenly. Make up class  will be noticed on next week. Please submit your homework  in next class
Sincerely
NLP TA

FIG. 4e

E-mail Message

To Students

NLP TA 2009-08-07 12:15:03

Dear student
The NLP class  next week will be canceled due to the professor's business trip suddenly. Make up class  will be noticed on next week.
Please submit your homework  in next class 
Sincerely
NLP TA

[EMAIL] Deadline of Pattern Recognitio...
[NOTE] Project Meeting for IT Managem...
[SMS] I've just finished the homewor...

FIG. 4f

METHOD FOR PROVIDING HYPERTEXT LINKS IN MOBILE TERMINAL

RELATED APPLICATIONS

This application claims priority to and the benefit of Korean Patent Application No. 10-2009-0116877, filed on Nov. 30, 2009, in the Korean Intellectual Property Office, the entire content of which is incorporated herein by reference.

BACKGROUND

1. Field of the Invention

The present invention relates to a method for managing and searching information in a mobile terminal and methodology for constructing the method. More particularly, the present invention relates to a system for analyzing information stored or newly received in a mobile terminal to construct a hypertext network for related information.

2. Description of the Related Art

Recently, as mobile devices are rapidly developed, they have had more and more ability. The mobile devices refer to mobile terminals including mobile phones, cellular phones, smart phones and portable digital assistants (PDAs). For example, similar to personal computers (PCs), most of the recently manufactured smart phones come with a built-in operating system capable of providing a platform to software providers. Mobile terminals with no built-in operating system also have basic functions related to a telephone call and functions including Email, Internet, Music and Global Positioning System (GPS) as well as a camera function. In accordance with such a tendency, current mobile terminals store not only telephone numbers or short message service (SMS) messages, like conventional mobile terminals, but also various pieces of information including Photograph, Music, Moving Picture, Schedule, Note, Email and the like.

Given the increased volume and diversity of the information available on and through mobile phones, it is very important to search information in the mobile terminals Mobile terminals are frequently used as a means for easily storing information at any place in any time. Since information stored in a mobile terminal may be used later by a user, it is generally stored in the mobile terminal without deletion for a certain period of time.

Information search in a mobile terminal has both constraint factors caused by the limited size of the mobile terminal and opportunity factors characterized by easy portability. That is, a small-sized screen of the mobile terminal serves as a constraint factor in which a large amount of information cannot simultaneously be displayed on the screen. In addition, an uncomfortable input interface of the mobile terminal serves as a constraint factor in information search as compared with PCs. Hence, it is reported that high-end search functions in the mobile terminal are not frequently used and that search words inputted by a user are shorter than those inputted by using a keyboard in a general PC.

On the other hand, various attempts have been made to allow a user to perform an easy search. That is, studies have been conducted to provide a query completion function on a search window of a search engine similar to a conventional search engine, to provide frequently used queries to users in advance, or to provide a convenient search interface. However, among theses studies, there is no study for analyzing information (user information, information received by a user, information stored by the user, and the like), stored in a mobile terminal, to provide related information. In the recently manufactured smart phones, information may be obtained through a keyword-based search, regardless of services (SMS, e-mail, album and the like). However, as the amount of information in the smart phones is increased, the number of results obtained through a simple keyword-based search is also increased, and there is a limitation in simultaneously displaying all the searched results on a display.

SUMMARY OF THE INVENTION

The present invention is conceived to solve the aforementioned problems. Accordingly, the object of the present invention is to provide a method for providing hypertext links, in which text information in a mobile phone is analyzed, and a hypertext link is provided to information to be searched by a user, so that a user can identify and select related information, thereby providing user's convenience and reducing the amount of information displayed.

According to an aspect of the present invention, there is provided a method for providing hypertext links in a mobile terminal, the method comprising: when a text is provided, preprocessing the provided text; extracting anchor text candidates in the preprocessed text; computing relatedness between terms; determining ranking based on the computed relatedness using context information; and constructing a hypertext system for providing hypertext links to the provided text based on the ranking.

Preprocessing of the provided text may be to parse the text by performing processes including part-of-speech tagging, stopword removal and named entity identification.

Extracting the anchor text candidates in the preprocessed text may be to classify preprocessed results into one or more categories.

In extracting the anchor text candidates in the preprocessed text, the preprocessed results may be classified into five categories including person or group name, place name, activity or event name, time expression and theme. At this time, the preprocessed results may be classified into five categories by a rule-based classifier based on vocabulary-dictionary, using named entity recognition.

Calculating term-to-term relatedness may be to compare a vocabulary belonging to the anchor text candidates with existing information stored in the mobile terminal and calculate a degree of relatedness of them.

Determining ranking based on the context information using the relatedness may be to determining ranking based on context information on time.

Determining the ranking based on the context information using the relatedness may be to determining ranking based on context information on place.

Constructing the hypertext system for providing the hypertext links to the provided text based on the ranking is to provide a hypertext link to a word with related information in the provided text.

Constructing the hypertext system for providing the hypertext links to the provided text based on the ranking, when the provided text has a word with two or more pieces of related information, a list of the related information with the word may be displayed.

The list of the related information may have an order determined by the ranking based on the relatedness between terms.

The related information may contain information included in a short message service (SMS), a mailing service, a schedule service and a photo gallery service.

BRIEF DESCRIPTION OF THE DRAWINGS

The above and other aspects, features and advantages of the present invention will become apparent from the following description of preferred embodiments given in conjunction with the accompanying drawings, in which.

DETAILED DESCRIPTION OF THE INVENTION

Exemplary embodiments now will be described more fully hereinafter with reference to the accompanying drawings, in which exemplary embodiments are shown. This disclosure may, however, be embodied in many different forms and should not be construed as limited to the exemplary embodiments set forth therein. Rather, these exemplary embodiments are provided so that this disclosure will be thorough and complete, and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, like reference numerals in the drawings denote like elements. The shape, size and regions, and the like, of the drawing may be exaggerated for clarity.

Figure 1:
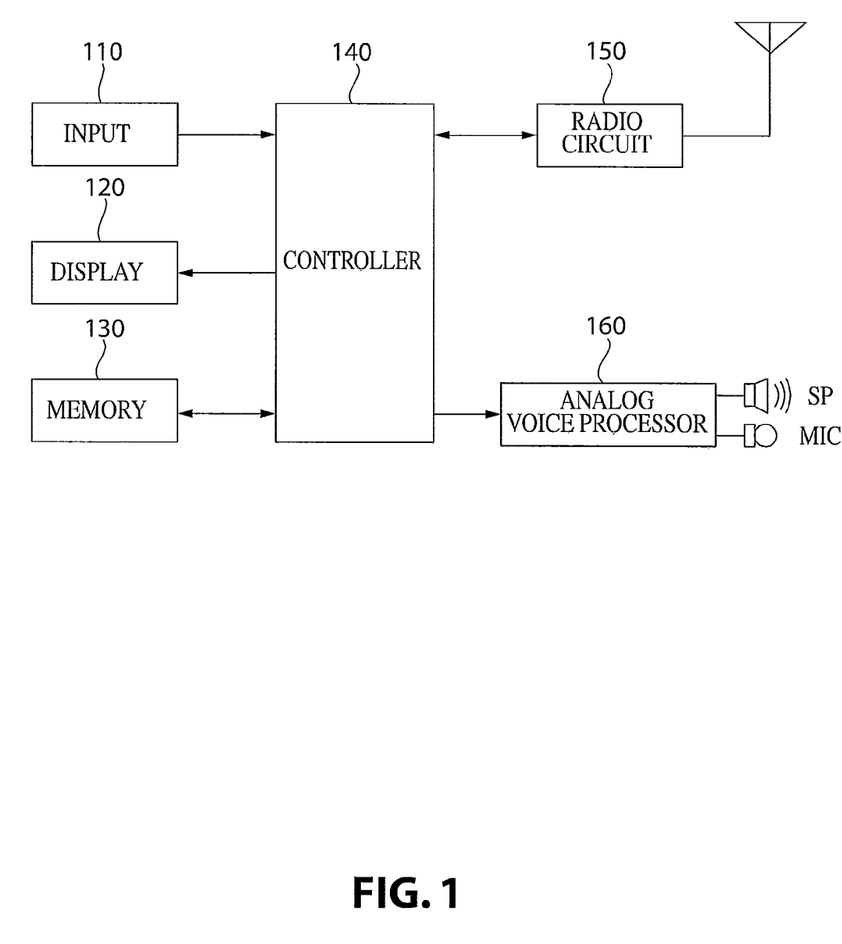
FIG. 1 is a block diagram illustrating the internal structure of a mobile terminal according to an embodiment of the present invention.

FIG. 1 is a block diagram illustrating the internal structure of a mobile terminal according to an embodiment of the present invention. The mobile terminal comprises an input 110, a display 120, a memory 130, a controller 140, a radio circuit 150 and an analog voice processor 160.

The input 110 may include various devices such as a keypad, a jog shuttle, a point stick and a touch screen. The input 110 is used when a user select a desired function or when the user input information.

The display 120 is used to provide various pieces of information to a user therethrough. A liquid crystal display (LCD) is frequently used as the display 120.

The memory 130 stores program and data necessary for operation of the mobile terminal. The memory 130 may include various devices such as an erasable programmable read only memory (EPROM), a static random access memory (SRAM) and a flash memory.

The controller 140 is used to control all operations of the mobile terminal. The controller 140 may include a microprocessor, a digital signal processor and the like. The controller 140 further comprises a baseband signal processing circuit for processing baseband signals transmitted from the radio circuit 150.

The radio circuit 150 is a circuit for transmitting/receiving voice and control information to/from base stations by radio. The radio circuit 150 is used to receive call signals transmitted from an external mobile terminal through an antenna and transmit them to the controller 140 or to transmit data stored in the memory 130 to a mobile terminal of a caller through the antenna.

The analog voice processor 160 is used to convert digital voice signals into analog voice signals and amplify them or to amplify voice signals transmitted from a microphone (MIC) and convert them into digital signals.

Hereinafter, a method for constructing and providing a hypertext system in the mobile terminal having the aforementioned structure will be described in detail with reference to the accompanying drawings.

Figure 2:
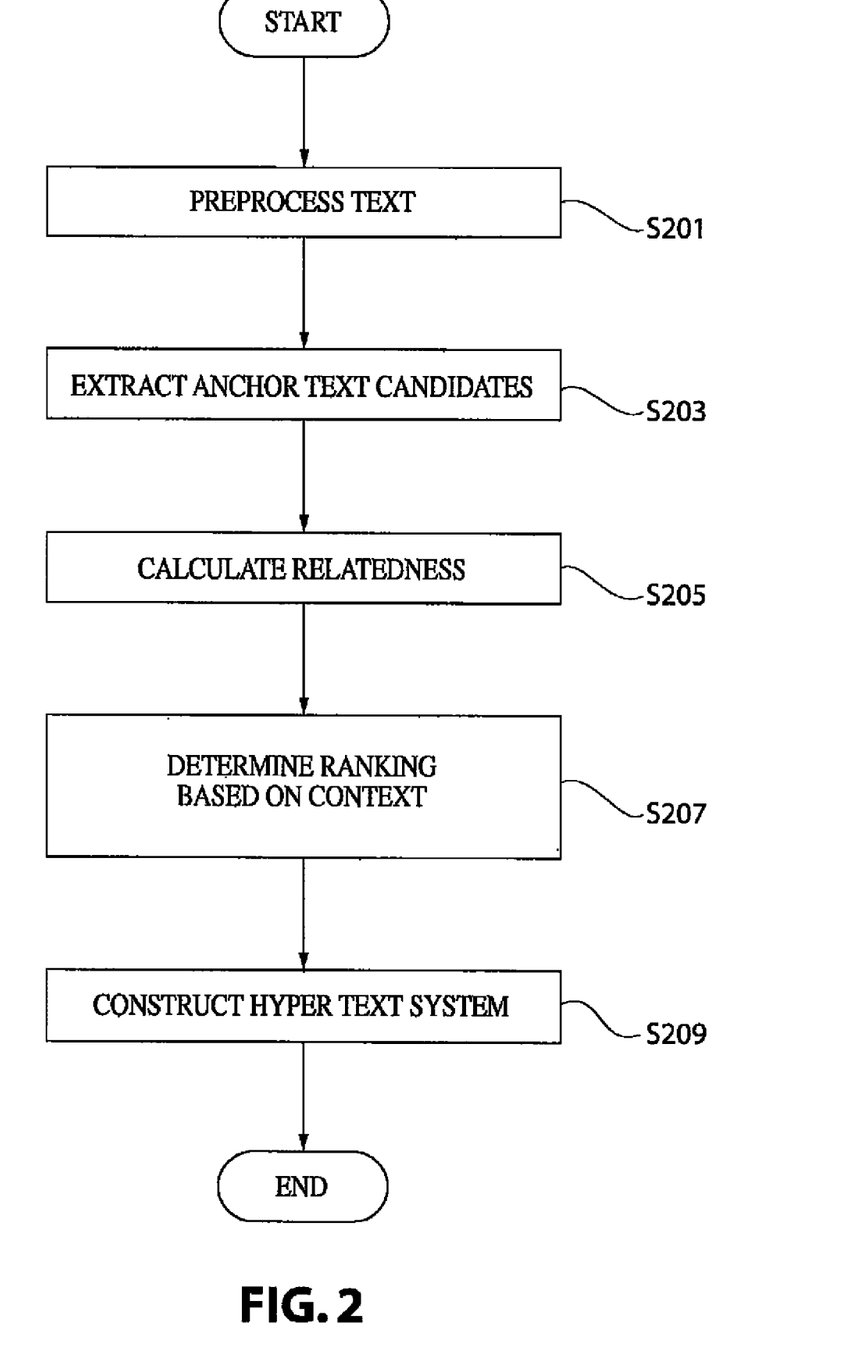
FIG. 2 is a flowchart illustrating a method for providing hypertext links in the mobile terminal according to the embodiment of the present invention.

FIG. 2 is a flowchart illustrating a method for providing hypertext links in the mobile terminal according to the embodiment of the present invention.

If a text is provided, preprocessing is performed for the provided text (S201). In this embodiment, the preprocessing of the text at S201 may be to parse the text by performing processes including part-of-speech tagging, stopword removal and named entity recognition.

Subsequently, anchor text candidates are extracted in the preprocessed text (S203). In this embodiment, extracting the anchor text candidates in the preprocessed text at S203 may be to classify preprocessed results into one or more categories. More specifically, the preprocessed results may be classified into five categories including person or group name, place name, activity or event name, time expression and subject. At this time, the preprocessed results may be classified into five categories by a rule-based classifier based on vocabulary-dictionary, using named entity recognition.

Subsequently, relatedness of terms belonging to the anchor text candidates are calculated (S205). In this embodiment, calculating relatedness at S205 may be to compare a vocabulary belonging to the anchor text candidates with existing information stored in the mobile terminal and calculate relatedness of the terms.

Subsequently, ranking based on context information is calculated using the relatedness (S207). In this embodiment, calculating the ranking based on the context information using the relatedness of terms at S207 may be to calculate ranking based on context information on time or place. Therefore, detailed description will be described later.

Subsequently, a hypertext system is constructed based on the calculated ranking (S209). In this embodiment, the construction of the hypertext system at S209 may be to provide a hypertext link to a word with related information in the provided text. If the provided text has a word with two or more pieces of related information, a list of the related information can be displayed. At this time, the list of the related information may have an order determined by the ranking based on the relatedness with the corresponding anchor candidates and the context information on time and place.

In this embodiment, the related information may contain information included in a short message service (SMS), a mailing service, a schedule service and a photo gallery service.

Figure 3:
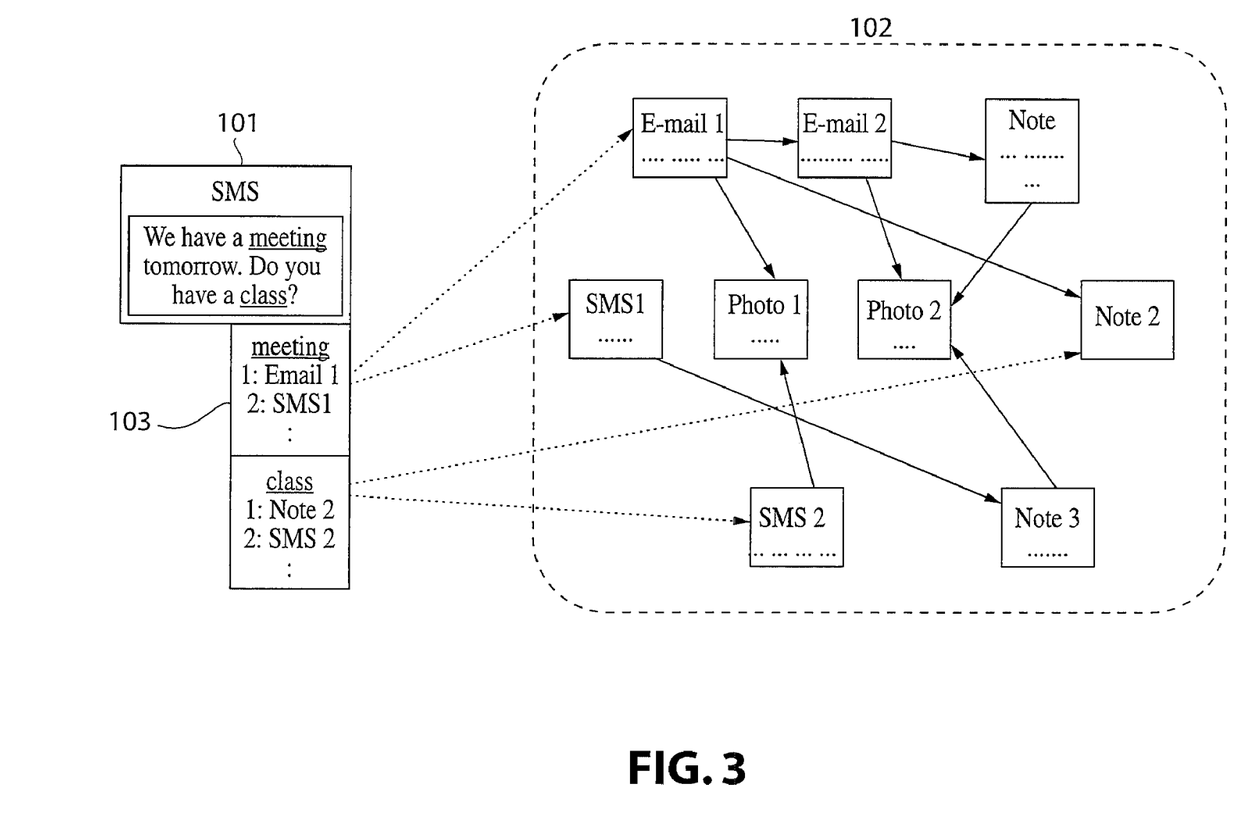
FIG. 3 is a view illustrating a hypertext system in the mobile terminal according to the embodiment of the present invention.

FIG. 3 is a view illustrating a hypertext system in the mobile terminal according to the embodiment of the present invention.

Referring to FIG. 3, if new information items such as a SMS message, a schedule item, a note and a photograph are received or created in the mobile terminal, they are connected to a previously constructed hypertext system 102. Thus, the mobile terminal provides options that enable a user to identify and select a list of information items related to each query. Here, one or more anchor text candidates are used as the respective queries.

In the embodiment of FIG. 3 is shown an exemplary screen 101 of the mobile terminal, by which an SMS message is received. The received SMS message is connected to the hypertext system 102. A list of "1:Email" and "2:SMS1", linked to the word "meeting" is displayed on the screen 103, and a list of "1:Note2" and "2:SMS2", linked to the word "class" is displayed on the screen 103.

At S207, the process of calculating the ranking based on the context information on time or place will be described in detail.

For example, when the term "project meeting" is related with several information items on a schedule, the word "tomorrow" that exists together with the words "project meeting" becomes a main factor in which the ranking may be determined among the several information items.

Whether or not to create a hyper text is determined by relatedness between a query and vocabularies in a text. Here, a method of extending tf*idf using the relatedness may be used.

First, tf (conventional term frequency) is as follows.

$$tf_{i,j} = \frac{n_{i,j}}{\sum_k n_{k,j}} \quad (1)$$

Here, $n_{i,j}$ denotes the frequency of appearance of a specific vocabulary in a document $d_j$ for a term $t_i$.

If it is considered that one document is a set of words, the document D is as follows.

$$D = \{w_1, \ldots, w_n\} \quad (2)$$

At this time, the frequency of appearance of a specific vocabulary is as follows.

$$n_{i,j} = \sum_{w \in D_j} f(w, t_i) \quad (3)$$

$$f(w, t) = \begin{cases} 1 & w = t \\ 0 & o.w. \end{cases}$$

That is, it can be seen how many times a specific vocabulary $t_i$ appears in one document.

Here, if function f is applied to the relatedness between terms calculated above, the tf, to which the relatedness value is applied, may be expressed by Equation 4.

$$f_s(w,t) = sim(w,t) \quad (4)$$

The function is improved by applying the relatedness between terms, thereby calculating ranking based on not only a specific vocabulary but also a related vocabulary.

For example, in the document " . . . symposium on . . . meeting schedule . . . at conference room . . . ", the word to be calculated is 'meeting'. In the conventional tf method, the word 'meeting' appears once in the document, and hence, the tf is 1. However, in the tf method improved by applying the relatedness in the present invention, words 'symposium' and 'conference', related to the word 'meeting' are also considered in the tf. For example, if the relatedness value between the words 'symposium' and 'meeting' is 0.6 and the relatedness value between the words 'conference' and 'meeting' is 0.7, the tf is 1.0+0.6+0.7=2.3 in the improved method. Strictly speaking, the improved method is not referred to as a method of calculating term frequency but referred to as a method corresponding to term frequency.

If idf (inverse document frequency) is described in the same manner, conventional idf is as follows.

$$idf_i = \log \frac{|D|}{|\{d : t_i \in d\}|} \quad (5)$$

Here, $|\{d:t_i \in d\}|$ denotes the number of documents containing a specific vocabulary. The idf may be expressed by Equation 6.

$$df_i = |\{d : t_i \in d\}| \quad (6)$$

$$= \sum_{d \in D} g(d, t_i)$$

Here, if the document contains the corresponding vocabulary, function g is 1. That is, the function g is as follows.

$$g(d, t) = \begin{cases} 1 & t \in d \\ 0 & o.w. \end{cases} \quad (7)$$

The function g is 1 if the document contains the corresponding vocabulary regardless of whether the document contains the corresponding vocabulary once or several times. The function g may be expressed by Equation 8.

$$g(d,t) = \max(f(w \in d, t)) \quad (8)$$

In Equation 8, it is noted that the function g is zero if all vocabularies are not identical to a corresponding vocabulary in one document. If the improved function f using the relatedness is used, the conventional document frequency showing whether or not a document contains a specific vocabulary may be changed into a document frequency showing how much related vocabulary with the specific vocabulary the document contains.

Hereinafter, a method of applying context information on time or place will be described.

Results obtained from the method of extended tf*idf above may be reordered by applying time information. The results are grouped using the before and after relationship between the time period when a source document mentions and the time period when a target document mentions. Grouping by time information is reflected for the final ranking in sequence by reordering results so that the rank of a temporally and/or spatially related message goes up Here, an example of the time period when the source and target documents mention will be described. In the document "Did you receive the package I've sent last week? 2009-10-11 04:32", the time mentioned in the document is from Oct. 4, 2009 to Oct. 10, 2009, which is a past week of the time the document is created, Oct. 11, 2009.

As another example, in the document "The lecture room for a neighborhood leadership program (NLP) class is changed from Terman Hall to Creative Learning Building on Friday this week. 2009-10-7 15:43", the time mentioned in the document is Oct. 9, 2009.

FIGS. 4A to 4F are exemplary screens illustrating the method for providing hypertext links in the mobile terminal according to the embodiment of the present invention.

Figure 4A:
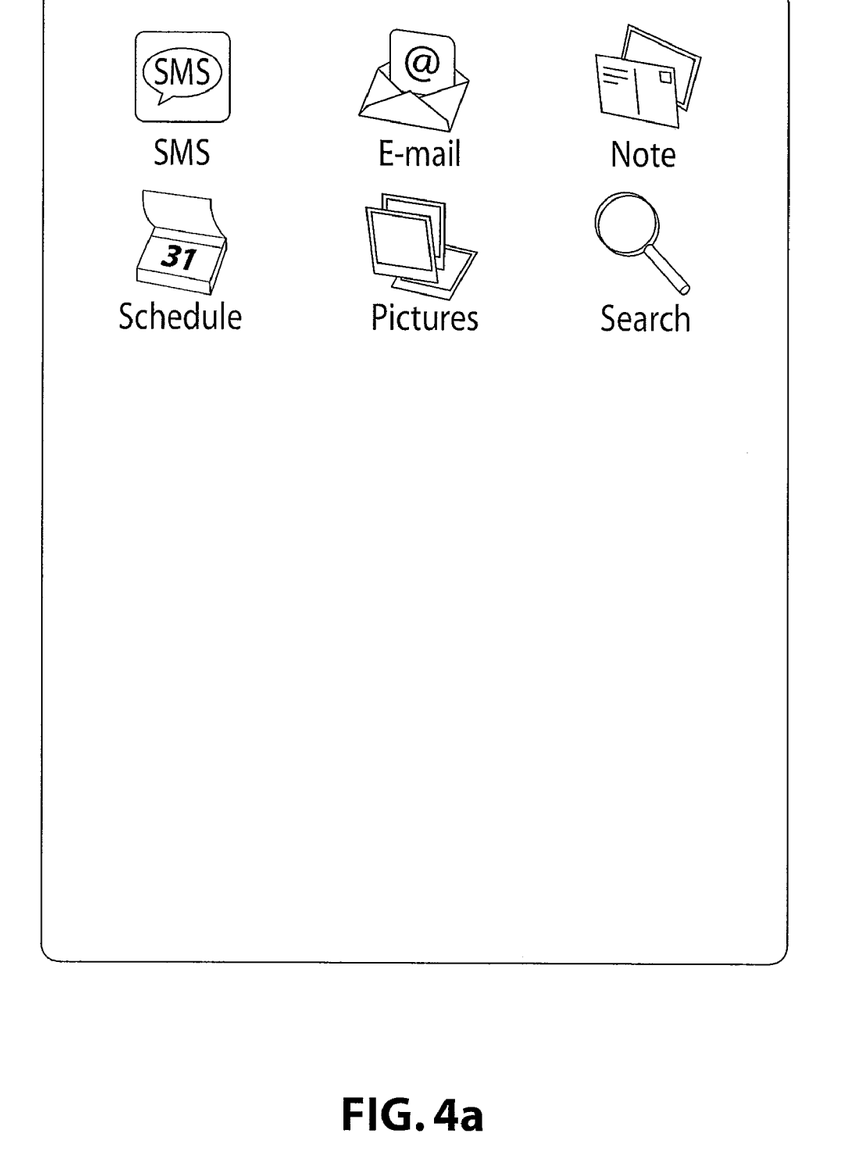
FIGS. 4A to 4F are exemplary screens illustrating the method for providing hypertext links in the mobile terminal according to the embodiment of the present invention.

FIG. 4A shows an exemplary screen on which shortcut icons of services "SMS, Email, Note, Schedule, Pictures, Search" are displayed. If a user selects a shortcut icon on the screen, the screen changes to the corresponding service.

Figure 4B:
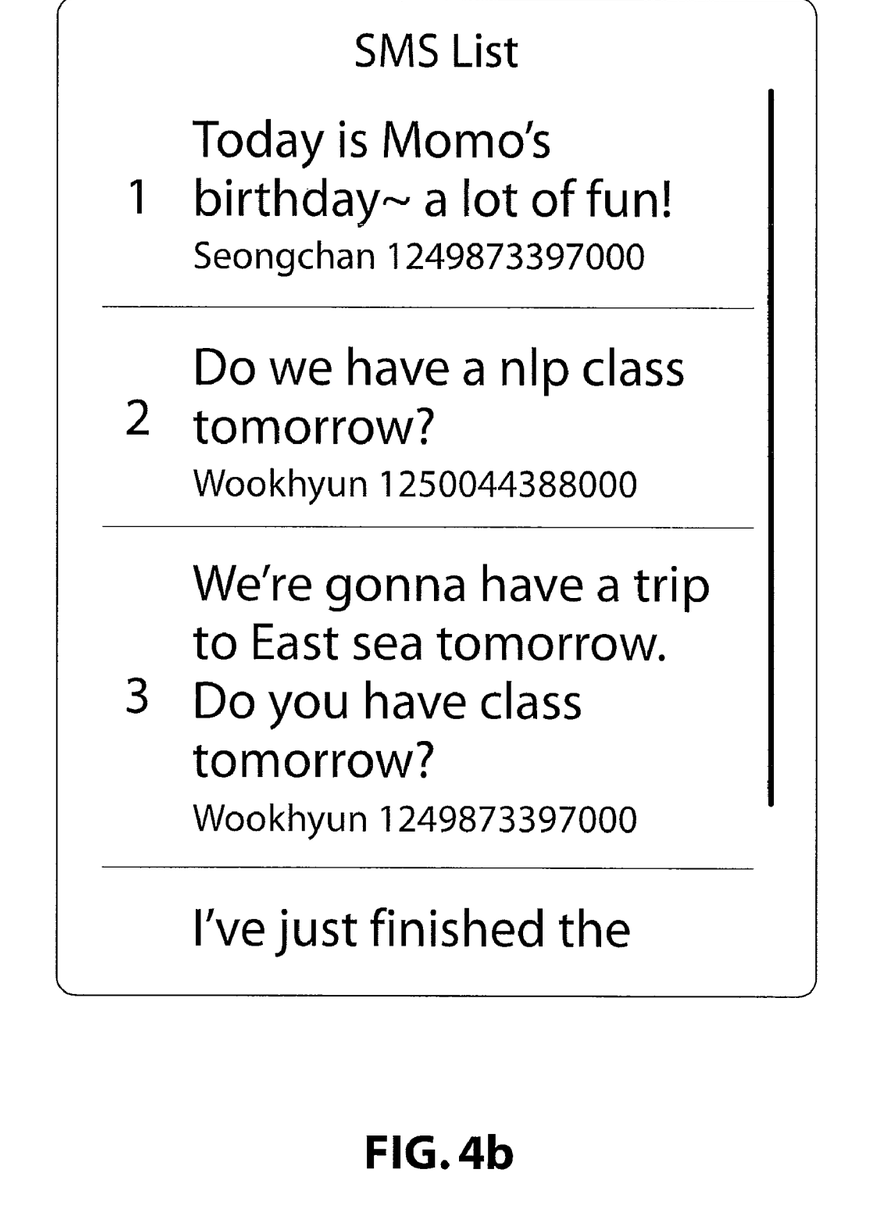
Figure 4C:
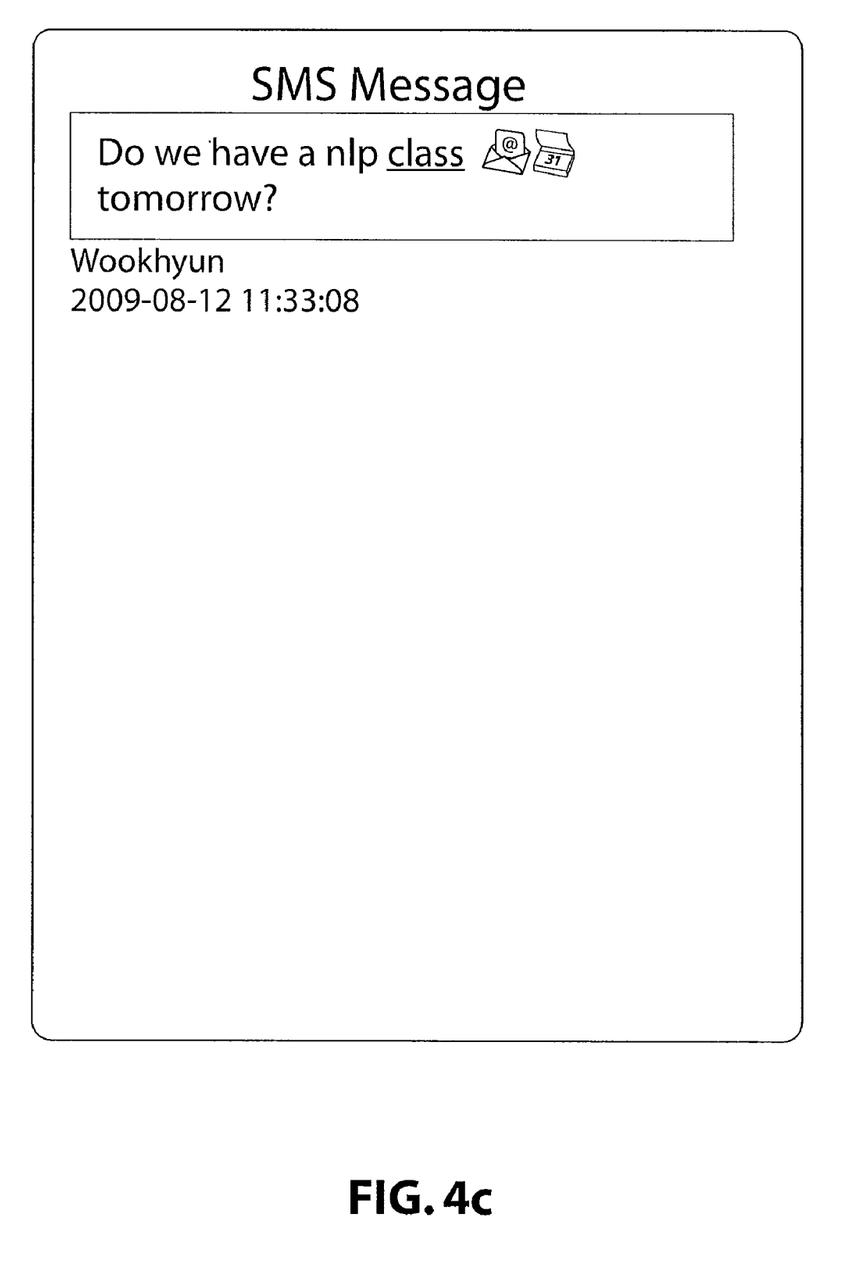

In FIG. 4A, if the user selects the service "SMS", "SMS List" is displayed as shown in FIG. 4B. In FIG. 4B, if the user selects a second message, a message shown in FIG. 4C is displayed. In the message, it can be seen that a hypertext link is provided to the word 'class'. A small image is shown at the upper right of the word 'class', which indicates that relative information on the word 'class' exists in an Email message and a note.

Figure 4D:
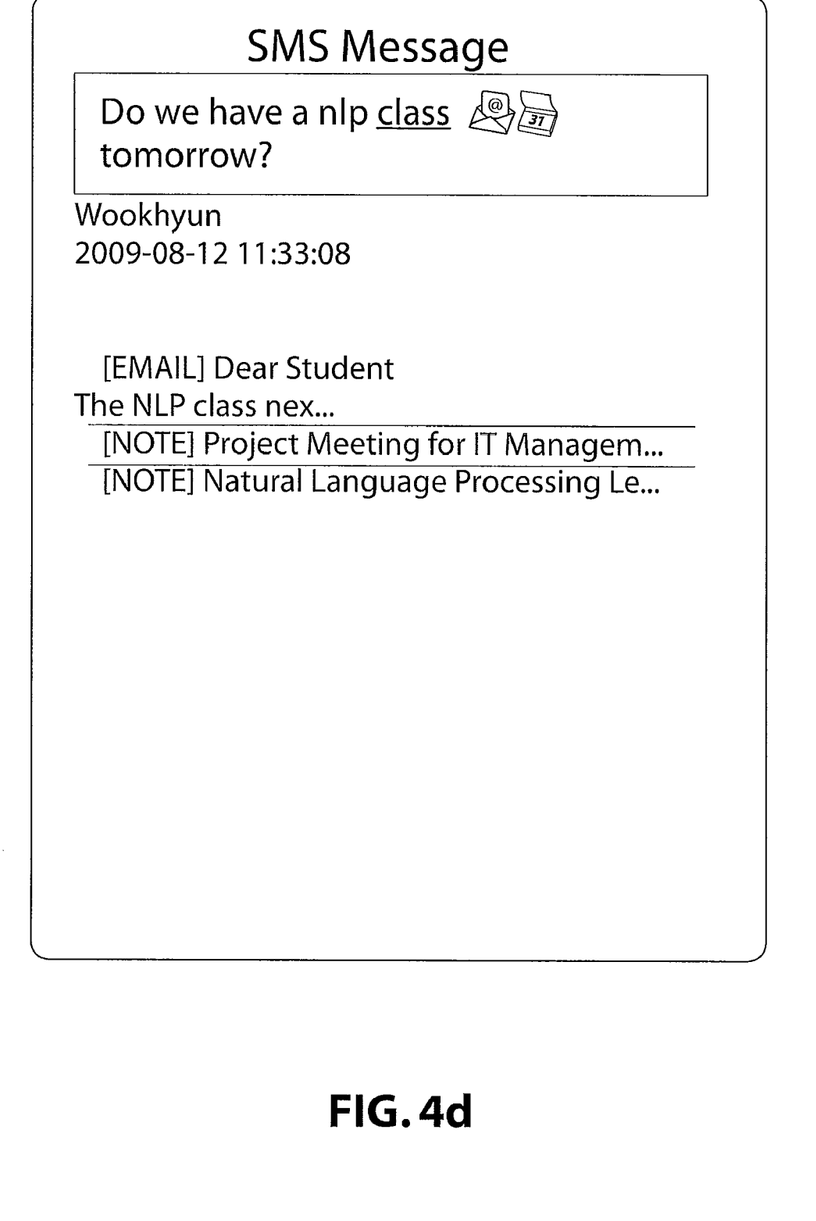
Figure 4E:
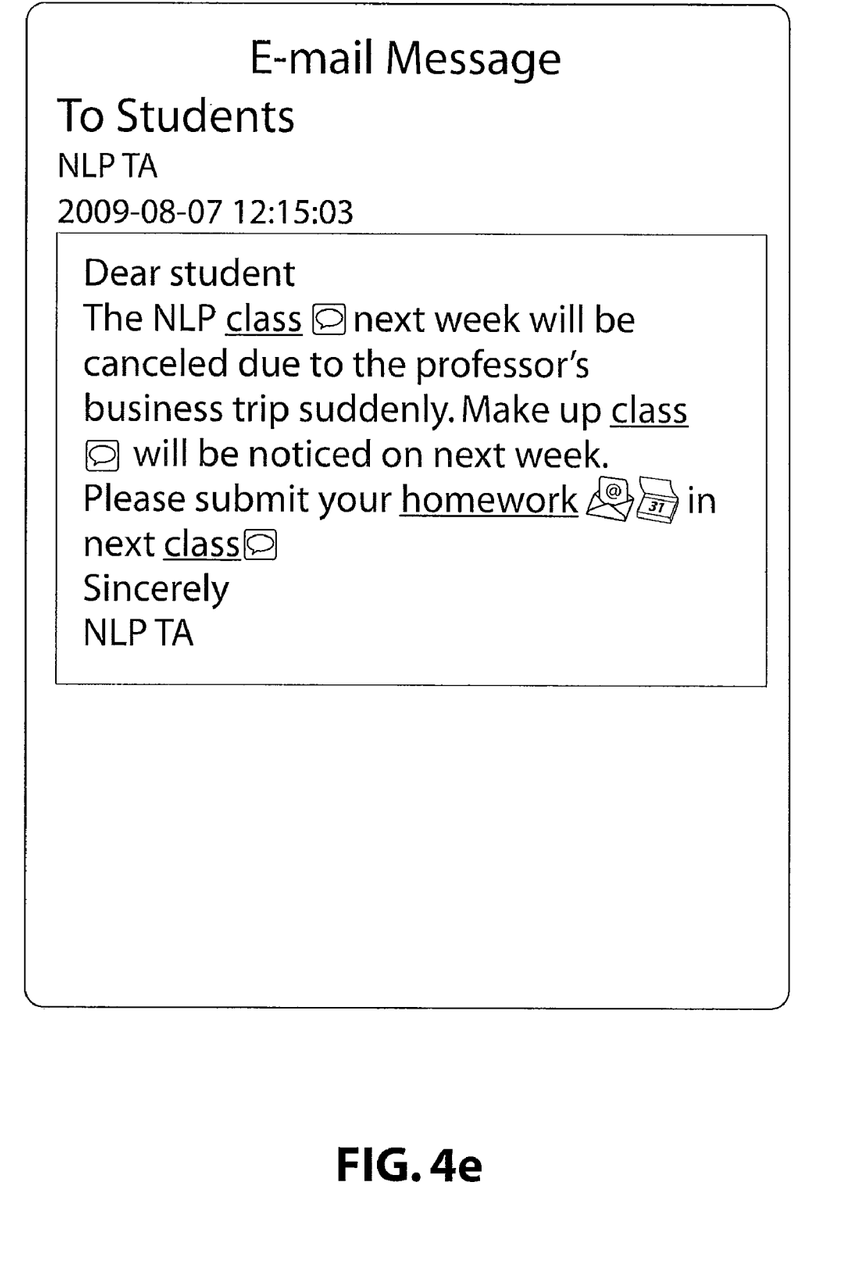
Figure 4F:
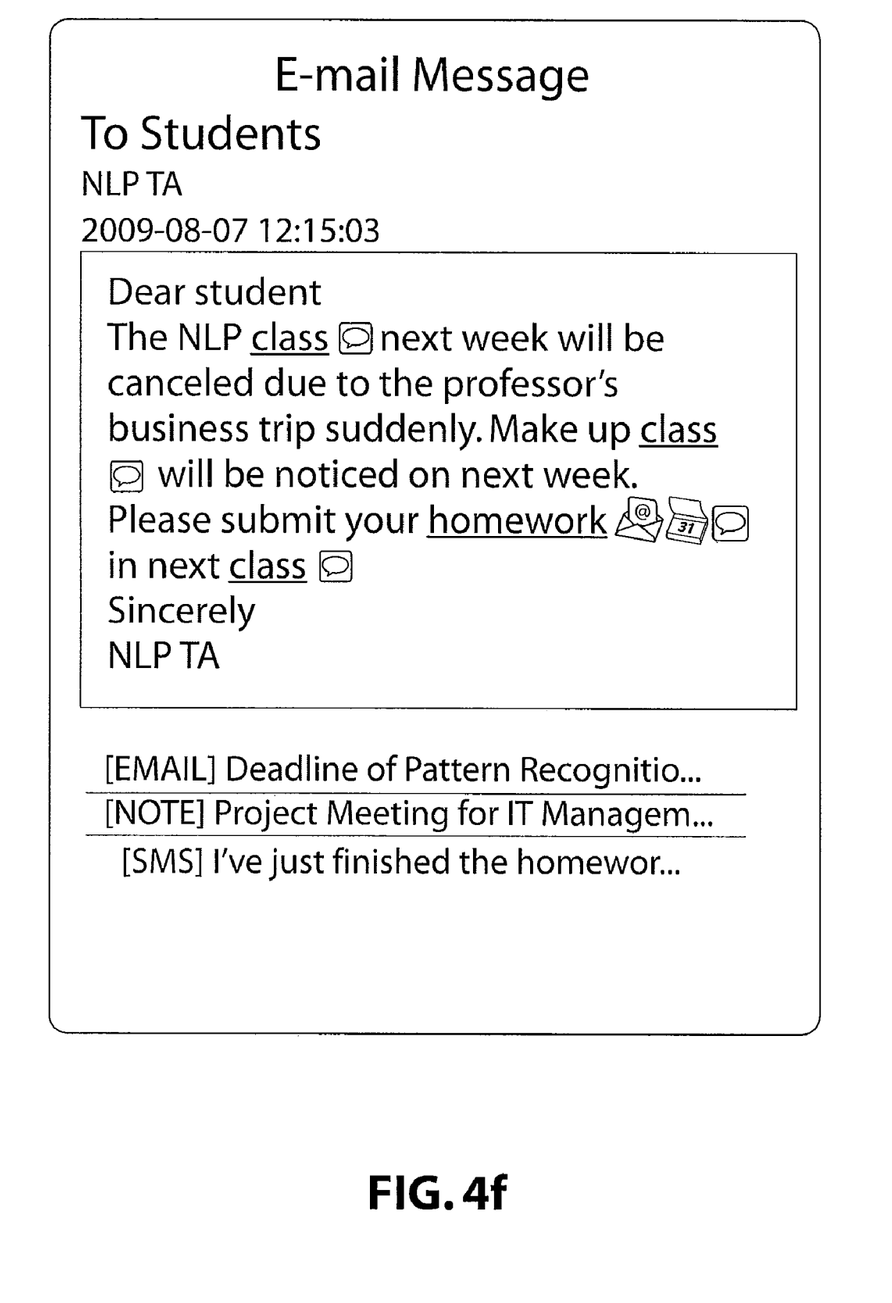

In FIG. 4C, if the user selects the word 'class', a list of related information list is displayed as shown in FIG. 4D. At this time, if the number of pieces of related information is only one, the screen may immediately move to the corresponding information. In this example, it can be seen in FIG. 4D that one Email message and two notes exist as the related information. If the user first selects the Email message on a screen of FIG. 4D, the corresponding Email message is shown on the screen as shown in FIG. 4E. It can be seen that hypertext links are also provided to words containing the related information in the Email message. Similarly, icon images shown at the upper right of the word, to which the hypertext link is provided, indicates which service the related information exists in. In FIG. 4E, if the user selects word 'homework', a list of information related to the word 'homework' is displayed as shown in FIG. 4F.

Advantageous Effects

According to the present invention, there is provided a method for providing hypertext links in a mobile terminal, which provides information management and search function using the hypertext links, so that information in the mobile terminal can be constructed by the hypertext links, thereby promoting user's convenience.

For example, in a mobile terminal of the present invention, if a text displayed on a display has a piece of related information, a hypertext link is directly connected to the related information. If the text has several pieces of related information, a list of the related information is displayed on the display. If a user selects an item in the list, a hypertext link is provided to the related information. Accordingly, related information is previously provided before the user inputs a query, thereby improving user's convenience in making full use of information in the mobile terminal.

Although the present invention has been described in connection with the preferred embodiments, the embodiments of the present invention are only for illustrative purposes and should not be construed as limiting the scope of the present invention. It will be understood by those skilled in the art that various changes and modifications can be made thereto within the technical spirit and scope defined by the appended claims.

What is claimed is:

1. A method for providing hypertext links in a mobile terminal, the method comprising:
   when a text is provided, preprocessing the provided text;
   extracting anchor text candidates in the preprocessed text;
   calculating relatedness between terms;
   determining ranking based on the relatedness using context information; and
   constructing a hypertext system for providing hypertext links to the provided text based on the ranking, such that the hypertext links provide search functions based on at least a portion of the provided text.

2. The method according to claim 1, wherein preprocessing of the provided text is to parse the text by performing processes including part-of-speech tagging, stopword removal and named entity recognition.

3. The method according to claim 1, wherein extracting the anchor text candidates in the preprocessed text is to classify preprocessed results into one or more categories.

4. The method according to claim 3, wherein, in the extraction of the anchor text candidates in the preprocessed text, the preprocessed results are classified into five categories including person or group name, place name, activity or event name, time expression and theme.

5. The method according to claim 4, wherein the preprocessed results are classified into five categories by a rule-based classifier based on vocabulary-dictionary, using named entity recognition.

6. The method according to claim 1, wherein the calculation of the relatedness of the vocabulary belonging to the anchor text candidates is to compare a vocabulary belonging to the anchor text candidates with existing information stored in the mobile terminal and calculate relatedness value.

7. The method according to claim 1, wherein the determination of the ranking based on the relatedness using the context information is to determine ranking using context information on time.

8. The method according to claim 1, wherein the determination of the ranking based on the relatedness using the context information is to determine ranking using context information on place.

9. The method according to claim 1, wherein the construction of the hypertext system for providing the hypertext links to the provided text based on the ranking is to provide a hypertext link to a term with related information in the provided text.

10. The method according to claim 9, wherein in the constructing of the hypertext system for providing the hypertext links to the provided text based on the ranking, when a term in the provided text has two or more pieces of related information, a list of the related information is displayed.

11. The method according to claim 10, wherein the list of the related information has an order determined by the ranking based on the relatedness of terms and context information.

12. The method according to claim 9, wherein the related information contains information included in a short message service (SMS), information included in a mailing service, information included in a schedule service and information included in a photo gallery service.

* * * * *